United States Patent
Defosse

(10) Patent No.: US 7,693,802 B2
(45) Date of Patent: Apr. 6, 2010

(54) SYSTEM FOR DETERMINING POSTAGE RATES ON THE BASIS OF THE THICKNESS OF THE MAIL ITEMS

(75) Inventor: Sébastien Defosse, Fontenay aux Roses (FR)

(73) Assignee: NEOPOST Technologies, Bagneux (FR)

( * ) Notice: Subject to any disclaimer, the term of this patent is extended or adjusted under 35 U.S.C. 154(b) by 404 days.

(21) Appl. No.: 11/625,495

(22) Filed: Jan. 22, 2007

(65) Prior Publication Data

US 2007/0198440 A1    Aug. 23, 2007

(30) Foreign Application Priority Data

Jan. 23, 2006    (FR)    .................................. 06 50226

(51) Int. Cl.
*G01G 19/413*    (2006.01)

(52) U.S. Cl. ..................................... 705/407

(58) Field of Classification Search ........................ None
See application file for complete search history.

(56) References Cited

U.S. PATENT DOCUMENTS

| | | | |
|---|---|---|---|
| 4,879,513 A | | 11/1989 | Spiegel et al. |
| 4,982,947 A | | 1/1991 | Milne |
| 5,535,127 A | * | 7/1996 | Uno et al. .................... 705/406 |
| 2003/0055795 A1 | * | 3/2003 | Sesek ......................... 705/410 |
| 2003/0209657 A1 | * | 11/2003 | Vejtasa .................. 250/231.13 |
| 2003/0236757 A1 | * | 12/2003 | Sadler et al. ................. 705/400 |
| 2004/0113358 A1 | * | 6/2004 | Engarto et al. ............... 271/262 |

FOREIGN PATENT DOCUMENTS

| EP | 0 548 874 A1 | 6/1993 |
|---|---|---|
| EP | 0 906 792 A2 | 4/1999 |

OTHER PUBLICATIONS

"Sunday Mirror Investigates Post rules in chaos as cost of sending cards & parcels varies across country.", Sharon Van Geuns, Sunday Mirror, Nov. 26, 2009.*

\* cited by examiner

*Primary Examiner*—John W Hayes
*Assistant Examiner*—Rob Wu
(74) *Attorney, Agent, or Firm*—Sughrue Mion, PLLC

(57) ABSTRACT

A system for determining postage rates, said system comprising a lever mounted to pivot about a pivot axis, a wheel disposed at one end of the lever and in contact, at rest, with a conveyor surface on which a mail item is conveyed, measurement means disposed at the other end of the lever for the purpose of measuring the angular displacement of said lever while the mail item is being conveyed and for the purpose of delivering a signal representative of the amplitude of said displacement, and a processor unit connected to the measurement means for determining the thickness of the mail item, the measurement means comprising an encoder provided with a plurality of openings, each of which corresponds to a determined threshold for a postage rate, which openings are distributed over a circular arc over an annular portion and are suitable for going past a stationary sensor comprising an emitter for emitting a light ray and a receiver for receiving said light ray, the processor unit being suitable for counting the number of openings through which said light ray passes as said wheel passes over said mail item, and for deducing from said number the postage rate corresponding to said mail item.

5 Claims, 2 Drawing Sheets

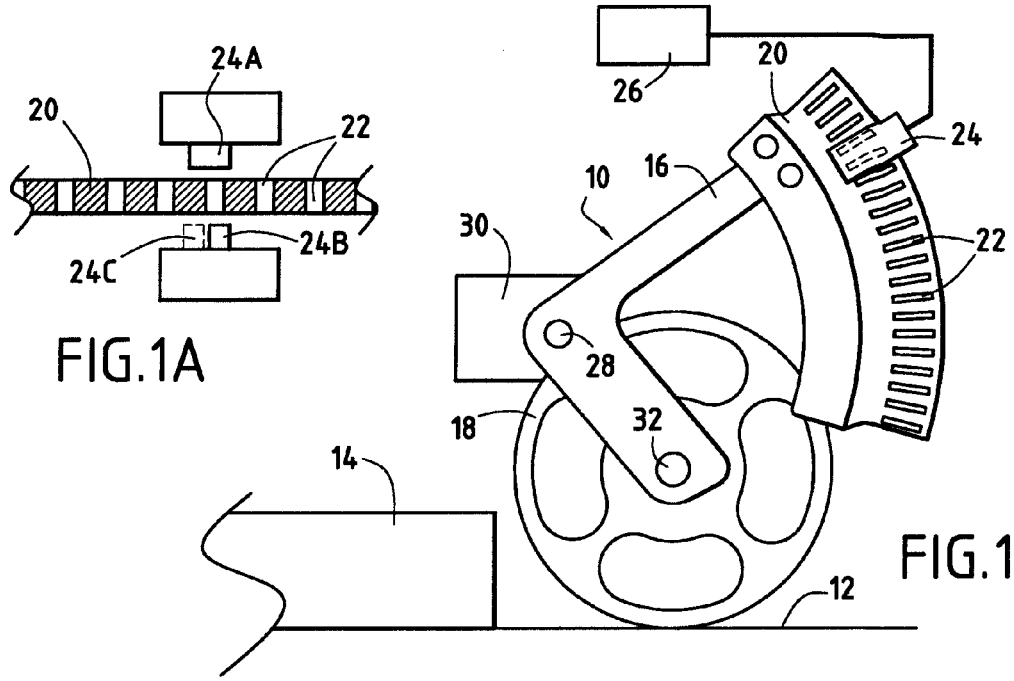
FIG.1A
FIG.1
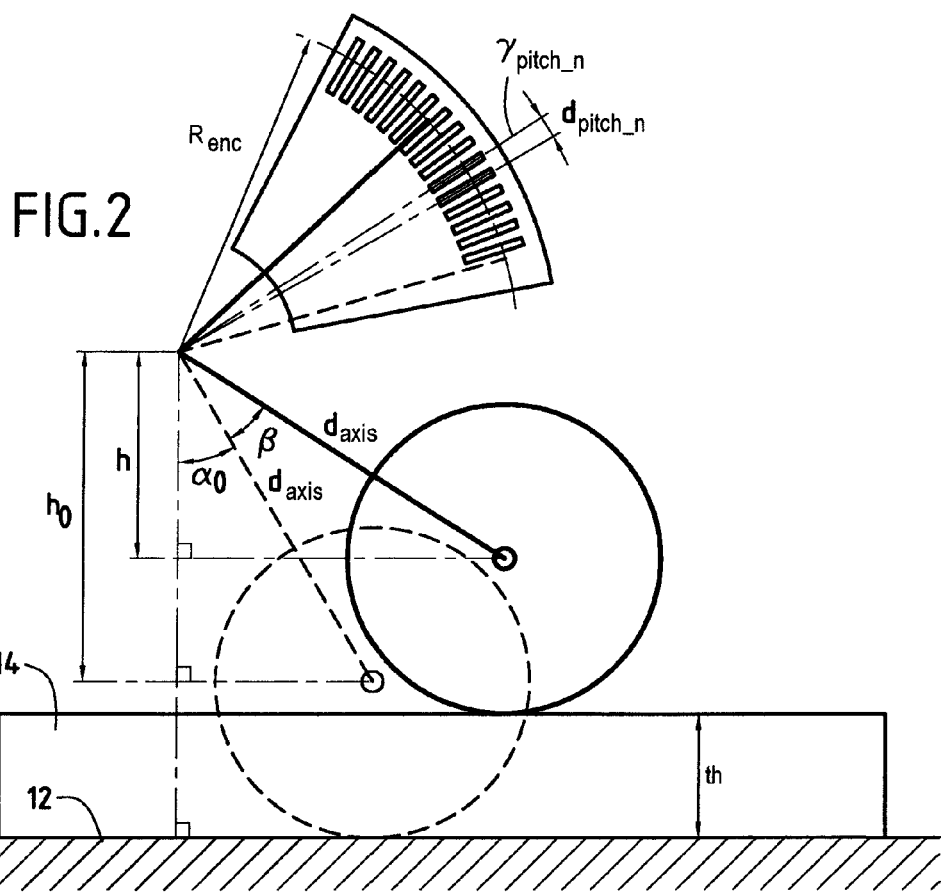
FIG.2

SYSTEM FOR DETERMINING POSTAGE RATES ON THE BASIS OF THE THICKNESS OF THE MAIL ITEMS

FIELD OF THE INVENTION

The present invention relates to the field of mail handling. It relates in particular to a device for measuring the thickness of a mail item conveyed through a "franking" system with a view to determining a postage rate.

PRIOR ART

It is known, e.g. from Documents U.S. Pat. No. 4,879,513 or U.S. Pat. No. 4,982,947, that devices exist for measuring thickness, e.g. the thickness of a ream of paper, on the basis of the variation in the inductance of an electrical circuit or of a differential transformer. However, such devices do not make it possible to determine postage rates.

OBJECT AND DEFINITION OF THE INVENTION

An object of the present invention is thus to remedy the above-mentioned drawbacks and to make it possible, in simple manner, to determine postage rates merely by measuring the thickness of the mail item. Another object of the invention is to make such determination possible on the fly, i.e. while the mail item is being conveyed through the franking system, and without said franking system being stopped.

These objects are achieved in accordance with the invention by means of a system for determining postage rates, said system comprising a lever mounted to pivot about a pivot axis, a wheel disposed at one end of the lever and in contact, at rest, with a conveyor surface on which a mail item is conveyed, measurement means disposed at the other end of the lever for the purpose of measuring the angular displacement of said lever while the mail item is being conveyed on said conveyor surface and for the purpose of delivering a signal representative of the amplitude of said displacement, and a processor unit connected to the measurement means for determining the thickness of the mail item, wherein said measurement means comprise an encoder provided with a plurality of openings, each of which corresponds to a determined threshold for a postage rate, which openings are distributed over a circular arc over an annular portion and are suitable for going past a stationary sensor comprising an emitter for emitting a light ray and a receiver for receiving said light ray, the processor unit being suitable for counting the number of openings through which said light ray passes as said wheel passes over said mail item, and for deducing from said number the postage rate corresponding to said mail item.

Thus, the use of a simple encoder provided with openings that are associated with an optical sensor makes it possible, by measuring the thickness of any mail item, to determine automatically which postage rate corresponds to said mail item.

Preferably, in order to determine the direction of displacement of the lever, said sensor further comprises another receiver that is phase offset by one quarter of the pitch relative to the first-mentioned receiver.

Preferably, said lever comprises two arms disposed in an L-shape or in a V-shape and forming between them an angle of in the range 30° to 90°.

BRIEF DESCRIPTION OF THE DRAWINGS

Other characteristics and advantages of the invention appear more clearly from the following description of particular embodiments given by way of example and with reference to the accompanying drawings, in which:

FIG. 1 is a view showing a measurement device for measuring the thickness of a mail item;

FIG. 1A is a view showing the measurement sensor;

FIG. 2 is a diagram explaining the measurement principle implemented in the device of FIG. 1.

DETAILED DESCRIPTION OF PREFERRED EMBODIMENTS

Figure 3:
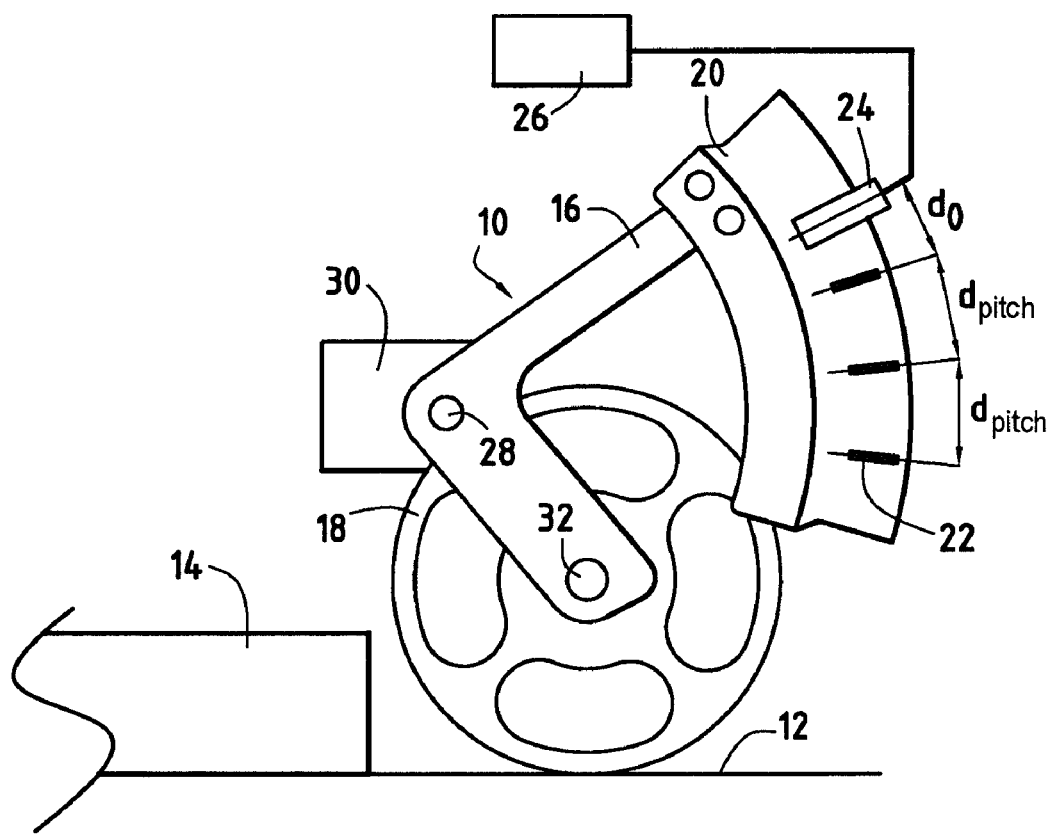
FIG. 3 is a view showing a system of the invention for determining postage rates.

In many countries, rates for carriage of mail items are based on criteria both of mail item weight and of mail item size (thickness, length of the envelope, and width of the envelope). As regards weight, the mail item must be ranked as belonging to a determined weight category. As regards size, checking must be performed to determine whether the thickness of the envelope is greater than thresholds (for example: 0.4 millimeters (mm) and 6.35 mm in the USA, 5 mm and 25 mm in the United Kingdom), or to determine whether the ratio between the length and the width of the envelope lies within two limits (e.g. 1.3<R<2.5 for the USA or R<the square root of 2 for Germany).

The weight of the mail item is in general measured within the franking system by a dynamic weighing module that weighs mail items on the fly. Prior knowledge of the dimensions of the mail item makes it possible to optimize weighing time and thus to improve the franking throughput significantly. Also, in order to assign the appropriate rate automatically to each mail item in a batch of non-uniform mail items, a measurement device is generally disposed at the feeder module of the franking system for the purpose of measuring the dimensions of each envelope and of transmitting said that information to a rate calculator. Applications FR 05 00929 and FR 05 00930 filed in the name of the Applicant illustrate devices making it possible to measure the width of a mail item on the fly.

FIG. 1 shows a device making it possible to determine postage rates by measuring the thickness of a mail item on the fly.

This device 10 is advantageously disposed at the outlet of a selection module that delivers the mail items 14 coming from a feeder module one-by-one onto a conveyor table 12. Said device comprises merely a lever 16 preferably having two arms forming an L-shape or a V-shape and having one end (e.g. the free end of an arm forming a limb of the L or of the V) connected to a wheel 18 that is actuated by the movement of the mail item with which it is in contact, the other end of said lever (e.g. the free end of the other arm) being connected to an encoder 20 which has markings 22 that move past a sensor 24 with which it co-operates and which is suitable for delivering the thickness of the mail item after said thickness has been determined by a processor unit 26.

Under the action of the wheel 18, the lever 16 pivots about a pivot axis 28 that is disposed, for example, at the intersection between the two limbs of the L or V that form between them an angle advantageously lying in the range 30° to 90°. The pivot axis is disposed transversely relative to the direction in which the mail items move, and it is associated with the frame 30 of the franking system. The wheel 18 is mounted to be free to rotate about a rotation axis 32 that is spaced apart from the pivot axis by an inter-axis distance ($d_{axis}$). The encoder 20 is advantageously in the form of an annular portion extending through an angle preferably lying in the range 30° to 45° and on which markings are provided. The markings on the encoder are preferably constituted merely by slots or openings disposed over a circular arc. The sensor 24 is advantageously formed by a light emitter 24A and a light receiver 24B (e.g. using light emitting diodes LEDs) secured to the frame and that act, each time a marking goes past, to deliver a signal for the processor unit 26. Thus, at the processor unit 26 (which includes, in particular, a counter that is reinitialized each time a mail item goes past), the number of openings or slots seen by the sensor is counted, and the thickness of the mail item is deduced from that number as indicated below.

Let the following variables be as indicated:

$\alpha_0$: angle at rest between the vertical and the lever;

$\beta$: angle of the lever relative to its rest position;

$d_{axis}$: distance between the lever pivot axis and the wheel rotation axis;

th: thickness of the mail item;

$R_{enc}$: radius of the encoder;

$d_{pitch\_n}$: distance between the openings n and n+1 of the encoder; and $\gamma_{pitch\_n}$: angle between the opening n and the opening n+1 of the encoder.

The thickness of the mail item is given by the following equation:

$$th = h_0 - h \quad (1)$$

$$h_0/d_{axis} = \cos\alpha_0 \quad (2)$$

$$h/d_{axis} = \cos(\alpha_0 + \beta) \quad (3)$$

(1), (2), and (3) give:

$$th = d_{axis}*(\cos\alpha_0 - \cos(\alpha_0 + \beta)) \quad (4)$$

$d_{axis}$ and $\alpha_0$ are known by construction;

$\beta$ is given by the encoder and sensor assembly:

$$\sin(\gamma_{pitch\_n}/2) = (d_{pitch\_n}/2)/R_{enc}$$

$$\gamma_{pitch\_n} = 2\arcsin[d_{pitch\_n}/(2*R_{enc})] \quad (5)$$

$$\beta = \gamma_{pitch\_1} + \gamma_{pitch\_2} + \ldots + \gamma_{pitch\_n} \quad (6)$$

(4), (5), and (6) thus give:

$$th = d_{axis}*(\cos\alpha_0 - \cos(\alpha_0 + 2\arcsin[d_{pitch\_1}/(2*R_{enc})] + \ldots + 2\arcsin[d_{pitch\_n}/(2*R_{enc})])) \quad (7)$$

Since $R_{enc}$ and $d_{pitch}$ are known by construction, determining the number of slots seen by the sensor thus does indeed suffice on its own to determine the thickness of the mail item.

However, in order to avoid falsifying the measurement, the lever must not bounce, and there must be no mail items of non-uniform thicknesses (the system sums the slots seen by the encoder, regardless of the direction of rotation of the lever). Thus, in order to avoid impacts that would lift the lever off the mail item, and so that it is possible to compute an average of the thicknesses at a plurality of places if the mail item is of non-uniform thickness, or indeed so as to take account of its maximum thickness only, it can be advantageous for the sensor to have 2 receivers operating in quadrature, i.e. having a distance dR between them such that:

$$dR = \tfrac{1}{4} d_{pitch} \,\text{modulo}\, [\tfrac{1}{2} d_{pitch}] \quad (8)$$

In this first variant, a first receiver 24B detects each changeover from an uninterrupted portion to an interrupted portion, and from an interrupted portion to an uninterrupted portion of the encoder. It is the state of the second receiver 24C, phase offset by one quarter of the pitch relative to the first receiver, that makes it possible to determine the direction of rotation of the lever and thus to add or to subtract each change of state of the first receiver. The angular pitch of the encoder (encoder pitch) must be constant in order to satisfy the condition (8).

In this configuration, the lever does not necessarily have to return to the rest position between mail items. The counter of the processor unit is not re-initialized because the system takes account of the direction of rotation of the lever, thereby making it possible to reduce the spacing between the mail items (with the possibility of making said spacing zero) and thus to increase franking throughputs.

In most countries, there are only one or two rating thresholds for thickness (e.g. 0.4 mm and 6.35 mm in the USA, 5 mm in Canada, 5 mm and 25 mm in the United Kingdom, and 5 mm, 10 mm, 20 mm, and 50 mm in Germany). Therefore the invention proposes to cause each slot of the encoder to correspond to a change of postage rate, the resulting assembly thus becoming a system for determining postage rates.

Thus, with two rating thresholds, the encoder shown in FIG. 3 is obtained. This encoder is provided with three openings only, the first opening being disposed at a distance $d_0$ from an initial position corresponding to absence of any mail item, the second opening 32 being distant by $d_{pitch}$ from the first opening 30, and the third opening 34, also distant by $d_{pitch}$ from the second opening 32, being necessary to the second receiver 24C in order to make it possible to determine the direction of rotation of the lever.

The positions of the openings can be determined as follows:

Starting from above-mentioned equation (7), the thickness $th_1$ corresponding to the first rate threshold is given by:

$$th_1 = d_{axis}*(\cos\alpha_0 - \cos(\alpha_0 + 2\arcsin[d_0/(2*R_{enc})]))$$

i.e. $\cos\alpha_0 - (th_1/d_{axis}) = \cos(\alpha_0 + 2\arcsin[d_0/(2*R_{enc})])$ $$\arccos[\cos\alpha_0 - (th_1/d_{axis})] = \alpha_0 + 2\arcsin[d_0/(2*R_{enc})] \quad (9)$$

$$[\arccos[\cos\alpha_0 - (th_1/d_{axis})] - \alpha_0]/2 = \arcsin[d_0/(2*R_{enc})]$$
$$\sin[[\arccos(\cos\alpha_0 - (th_1/d_{axis})) - \alpha_0]/2] = d_0/(2*R_{enc})$$

It is thus possible to choose $d_0$ such that:

$$d_0 = (2*R_{enc})*\sin[[\arccos(\cos\alpha_0 - (th_1/d_{axis})) - \alpha_0]/2] \quad (10)$$

Similarly, the thickness $th_2$ corresponding to the second rate threshold is, also starting from equation (7), given by:

$$th_2 = d_{axis}*(\cos\alpha_0 - \cos(\alpha_0 + 2\arcsin[d_0/(2*R_{enc})] + 2\arcsin[d_{pitch}/(2*R_{enc})]))$$

$$\cos\alpha_0 - (th_2/d_{axis}) = \cos(\alpha_0 + 2\arcsin[d_0/(2*R_{enc})] + 2\arcsin[d_{pitch}/(2*R_{enc})])$$

$$\arccos[\cos\alpha_0 - (th_2/d_{axis})] = \alpha_0 + 2\arcsin[d_0/(2*R_{enc})] + 2\arcsin[d_{pitch}/2*R_{enc})]$$

By injecting (9), the following is obtained:

$$\arccos[\cos\alpha_0 - (th_2/d_{axis})] = \arccos[\cos\alpha_0 - (th_1/d_{axis})] + 2\arcsin[d_{pitch}/2*R_{enc})]$$

$$[d_{pitch}/2*R_{enc})]\sin[[\arccos(\cos\alpha_0 - (th_2/d_{axis})) - \arccos(\cos\alpha_0 - (th_1/d_{axis}))]/2]$$

It is thus also necessary to choose $d_{pitch}$ such that:

$$d_{pitch} = (2*R_{enc})*\sin[[\arccos(\cos\alpha_0 - (th_2/d_{axis})) - \arccos(\cos\alpha_0 - (th_1/d_{axis}))]/2] \quad (11)$$

Thus, a device for determining postage rates that is implemented in a postage meter or "franking machine" in the United States and where the two rating thresholds are set respectively at $th_1 = 0.4$ mm and $th_2 = 6.35$ mm gives the following values for $d_0$ and for $d_{pitch}$ by applying the equations (10) and (11):

$d_0$=0.78 mm and $d_{pitch}$=10.21 mm where $d_{axis}$=25 mm, $R_{enc}$=35 mm, and $\alpha_0$=45°

It should be noted that applying equation (11) also makes it possible, by setting values of $d_{pitch}$, $d_{axis}$, and $\alpha_0$ as determined above, to determine $R_{enc}$, and then by applying equation (10), to determine $d_0$.

What is claimed is:

1. A system for determining postage rates, said system comprising:
- a lever mounted to pivot about a pivot axis and comprising two arms disposed in an L-shape or in a V-shape and forming between them an angle in the range of 30° to 90°, the two arms being immovable relative to one another,
- a wheel disposed at one end of the lever and in contact, at rest, with a conveyor surface on which a mail item is conveyed,
- measurement means disposed at the other end of the lever for the purpose of measuring the angular displacement of said lever while the mail item is being conveyed on said conveyor surface and for the purpose of delivering a signal representative of the amplitude of said displacement, and
- a processor unit connected to the measurement means for determining the thickness of the mail item,
- wherein said measurement means comprise an encoder provided with a plurality of openings, each of which corresponds to a determined threshold for a postage rate, which openings are distributed over a circular arc over an annular portion and are suitable for going past a stationary sensor comprising an emitter for emitting a light ray and a receiver for receiving said light ray, the processor unit being suitable for counting the number of openings through which said light ray passes as said wheel passes over said mail item, and for deducing from said number the postage rate corresponding to said mail item.

2. A system according to claim 1, wherein said sensor further comprises another receiver that is phase offset by one quarter of the pitch relative to the first-mentioned receiver.

3. A system according to claim 1, wherein the pivot axis is disposed perpendicular to each of the two arms of the lever in relation to a frame of the system.

4. A system according to claim 1, wherein the wheel is mounted to be free to rotate about a rotation axis that is parallel to and spaced apart from the pivot axis.

5. A system for determining postage rates, said system comprising:
- a lever mounted to pivot about a pivot axis and comprising two arms disposed in an shape or in a V-shape and forming between them an angle in the range of 30° to 90°, the lever being a single piece,
- a wheel disposed at one end of the lever and in contact, at rest, with a conveyor surface on which a mail item is conveyed,
- measurement means disposed at the other end of the lever for the purpose of measuring the angular displacement of said lever while the mail item is being conveyed on said conveyor surface and for the purpose of delivering a signal representative of the amplitude of said displacement, and
- a processor unit connected to the measurement means for determining the thickness of the mail item,
- wherein said measurement means comprise an encoder provided with a plurality of openings, each of which corresponds to a determined threshold for a postage rate, which openings are distributed over a circular arc over an annular portion and are suitable for going past a stationary sensor comprising an emitter for emitting a light ray and a receiver for receiving said light ray, the processor unit being suitable for counting the number of openings through which said light ray passes as said wheel passes over said mail item, and for deducing from said number the postage rate corresponding to said mail item.

* * * * *